(12) United States Patent
Lee et al.

(10) Patent No.: US 12,066,087 B2
(45) Date of Patent: Aug. 20, 2024

(54) DISCONNECT CLUTCH FOR DIFFERENTIAL

(71) Applicant: Schaeffler Technologies AG & Co. KG, Herzogenaurach (DE)

(72) Inventors: Brian Lee, Charlotte, NC (US); Michael Hodge, Creston, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/102,347

(22) Filed: Jan. 27, 2023

(65) Prior Publication Data

US 2024/0125377 A1    Apr. 18, 2024

Related U.S. Application Data

(60) Provisional application No. 63/417,314, filed on Oct. 18, 2022.

(51) Int. Cl.
| | |
|---|---|
| *F16H 48/40* | (2012.01) |
| *F16H 48/08* | (2006.01) |
| *F16H 48/24* | (2006.01) |
| *F16H 57/037* | (2012.01) |

(52) U.S. Cl.
CPC ............ *F16H 48/24* (2013.01); *F16H 48/08* (2013.01); *F16H 57/037* (2013.01); *F16H 48/40* (2013.01)

(58) Field of Classification Search
CPC ........ F16H 48/24; F16H 48/08; F16H 57/037; F16H 48/40

USPC .................................................. 475/230, 231
See application file for complete search history.

(56) References Cited

U.S. PATENT DOCUMENTS

| | | | | |
|---|---|---|---|---|
| 2,225,720 | A * | 12/1940 | Snow | ......................... F16H 3/64 475/269 |
| 8,663,051 | B2 * | 3/2014 | Sten | ........................ F16H 48/36 475/221 |
| 9,649,931 | B2 | 5/2017 | Zhao | |
| 10,883,548 | B2 * | 1/2021 | Lee | .......................... F16D 23/12 |
| 11,186,168 | B1 * | 11/2021 | Kim | ...................... B60K 17/165 |
| 11,189,168 | B2 | 11/2021 | Chun et al. | |
| 11,231,098 | B2 * | 1/2022 | Swinger | .................. F16H 48/26 |
| 2006/0270510 | A1 * | 11/2006 | Pistagnesi | ................ F16H 48/24 475/230 |

* cited by examiner

*Primary Examiner* — Roger L Pang

(57) ABSTRACT

A differential for a vehicle includes a final drive gear with a final drive gear spline, a differential carrier with a differential carrier spline, and an axially slidable clutch. The axially slidable clutch includes a first clutch spline drivingly engaged with a one of the final drive gear spline or the differential carrier spline and a second clutch spline for selectively drivingly engaging with the other one of the final drive gear spline or the differential carrier spline. In an example embodiment, the differential also includes a pair of side gears, each including an inner spline for drivingly engaging a respective axle shaft, a pair of radially offset spider gears, each drivingly engaged with both of the side gears, and a shaft extending through the pair of radially offset spider gears into the differential carrier.

12 Claims, 2 Drawing Sheets

DISCONNECT CLUTCH FOR DIFFERENTIAL

CROSS-REFERENCE TO RELATED APPLICATIONS

This application claims the benefit of U.S. Provisional Patent Application No. 63/417,314, filed Oct. 18, 2022, the disclosure of which is incorporated in its entirety by reference herein.

TECHNICAL FIELD

The present disclosure relates generally to a differential for a vehicle, and more specifically to a disconnect clutch for a differential.

BACKGROUND

Disconnect clutches for differentials are known. Examples are shown in U.S. Pat. No. 11,186,168 titled POWER TRAIN FOR VEHICLE to Kim et al. and U.S. Pat. No. 9,649,931 titled VEHICLE DIFFERENTIAL ASSEMBLY to Zhao.

SUMMARY

A differential for a vehicle includes a final drive gear with a final drive gear spline, a differential carrier with a differential carrier spline, and an axially slidable clutch. The axially slidable clutch includes a first clutch spline drivingly engaged with a one of the final drive gear spline or the differential carrier spline and a second clutch spline for selectively drivingly engaging with the other one of the final drive gear spline or the differential carrier spline. In an example embodiment, the differential also includes a pair of side gears, each of the side gears including an inner spline for drivingly engaging a respective axle shaft, a pair of radially offset spider gears, each of the radially offset spider gears being drivingly engaged with both of the side gears, and a shaft extending through the pair of radially offset spider gears into the differential carrier.

In some example embodiments, the axially slidable clutch further includes a ring portion with a circumferential notch arranged for receiving a shift fork. In some example embodiments, the differential also includes the shift fork engaged in the circumferential notch for axially displacing the axially slidable clutch to engage and disengage the second clutch spline with the other one of the final drive gear spline or the differential carrier spline. In an example embodiment, the differential also includes a threaded shaft. The shift fork has a threaded portion, the threaded shaft is installed in the threaded portion, and rotation of the threaded shaft in the threaded portion pivots the shift fork.

In some example embodiments, the first clutch spline faces radially inward and the second clutch spline faces radially outward. In some example embodiments, the first clutch spline is drivingly engaged with the differential carrier spline and the second clutch spline is selectively drivingly engaged with the final drive gear spline. In an example embodiment, the final drive gear has a drive gear portion and a spline portion with a cylindrical portion fixed to the drive gear portion and a radially inwardly extending protrusion including the final drive gear spline. In some example embodiments, the differential also includes a bearing. The final drive gear is rotatably supported on the differential carrier by the bearing. In an example embodiment, the bearing is a double row ball bearing.

In some example embodiments, the first clutch spline is selectively drivingly engaged with the differential carrier spline and the second clutch spline is drivingly engaged with the final drive gear spline. In some example embodiments, the final drive gear includes a drive gear portion and a differential housing fixed to the drive gear portion. The differential housing includes the final drive gear spline. In an example embodiment, the differential housing surrounds the differential carrier.

In some example embodiments, the differential housing includes a first differential housing half with a first radial wall and a second differential housing half with a second radial wall in contact with the first radial wall. In an example embodiment, the first radial wall and the second radial wall extend radially outwards, and the drive gear portion has a radially inwardly extending protrusion radially aligned with the first radial wall and the second radial wall. In an example embodiment, the differential also includes a bushing, and the differential housing is rotatably supported on the differential carrier by the bushing. In an example embodiment, the differential housing has a plurality of apertures, and the axially slidable clutch has a plurality of axial projections extending through respective ones of the plurality of apertures.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
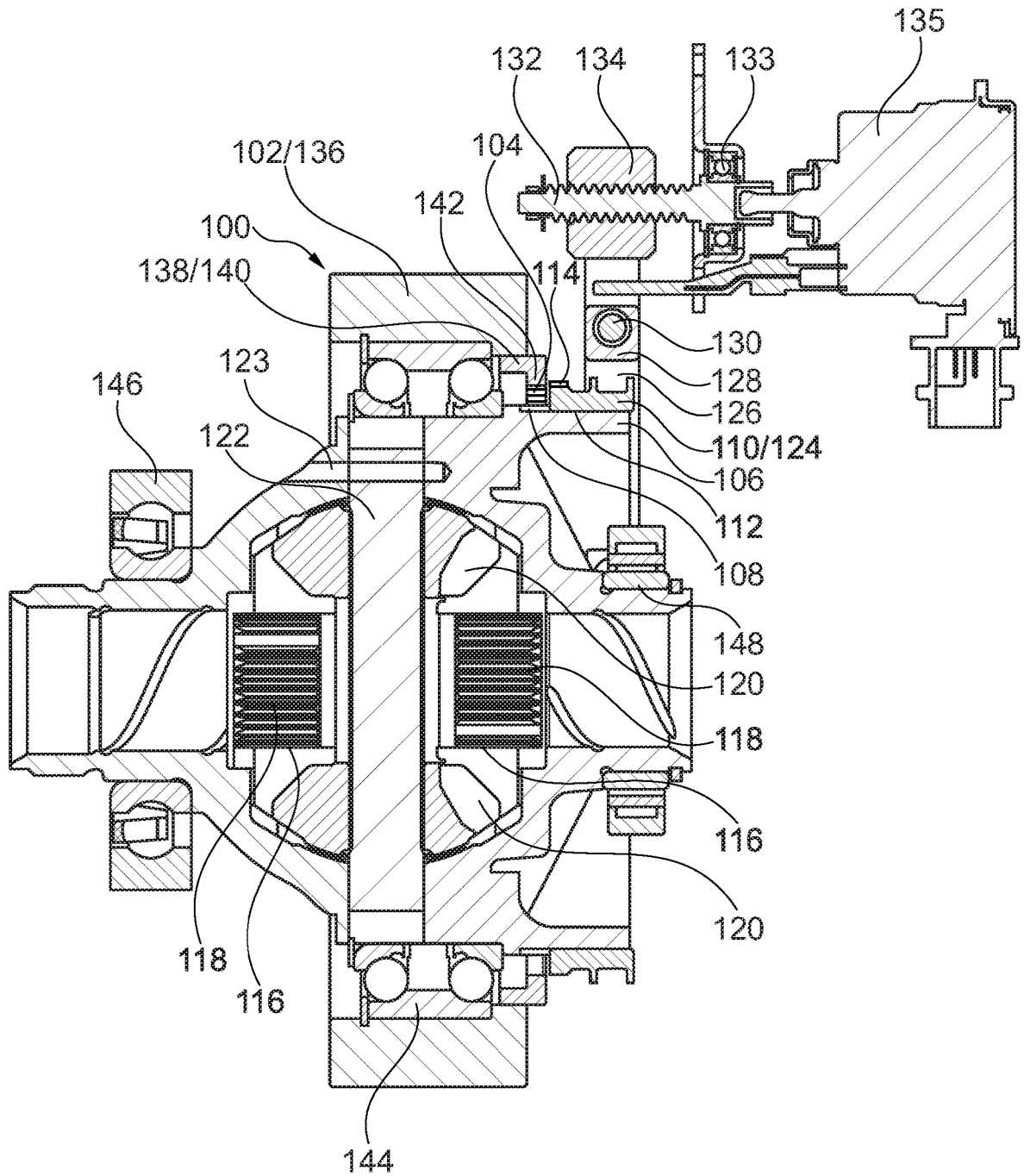
FIG. 1 illustrates a cross-sectional view of a first embodiment of a differential according to an example aspect of the present disclosure.

The following description is made with reference to FIG. 1. FIG. 1 illustrates a cross-sectional view of differential 100. Differential 100 for a vehicle (not shown) includes final drive gear 102 with final drive gear spline 104, differential carrier 106 with differential carrier spline 108, and axially slidable clutch 110. The axially slidable clutch includes first clutch spline 112 drivingly engaged with spline 108 and second clutch spline 114 for selectively drivingly engaging with spline 104 as described in more detail below. Differential 100 also includes side gears 116, each having an inner spline 118 for drivingly engaging a respective axle shaft (not shown), and radially offset spider gears 120, each drivingly engaged with both of the side gears, and shaft 122 extending through the radially offset spider gears into the differential carrier. Shaft 122 may be fixed in the differential carrier by a pin installed in hole 123, for example.

The axially slidable clutch includes ring portion 124 with circumferential notch 126 arranged for receiving shift fork 128. The shift fork is engaged in the circumferential notch for axially displacing the axially slidable clutch to engage and disengage second clutch spline 114 with spline 104 when pivoted on pivot shaft 130. That is, when the shift fork pivots, the axially slidable clutch is axially displaced. Differential 100 also includes threaded shaft 132. The shift fork includes threaded portion 134, arranged as a nut pivotable in the shift fork, for example. The threaded shaft is installed in the threaded portion and rotation of the threaded shaft in the threaded portion pivots the shift fork. Threaded shaft 132 is supported by bearing 133 and driven by electric motor 135, for example.

As shown in FIG. 1, first clutch spline 112 faces radially inward and second clutch spline 114 faces radially outward. First clutch spline 112 is drivingly engaged with differential carrier spline 108 and second clutch spline 114 is selectively drivingly engaged with final drive gear spline 104. Final drive gear 102 includes drive gear portion 136 and spline portion 138. The spline portion includes cylindrical portion 140 fixed to the drive gear portion (e.g., by welding) and radially inwardly extending protrusion 142 including the final drive gear spline. Differential 100 also includes bearing 144 and the final drive gear is rotatably supported on the differential carrier by the bearing. As shown in FIG. 1, bearing 144 is a double row angular contact ball bearing, although other bearing types (e.g., tapered roller bearing) may also be used. Bearing 146, shown as a ball bearing and bearing 148, shown as a cylindrical roller bearing, support the differential carrier in an axle housing (not shown).

Figure 2:
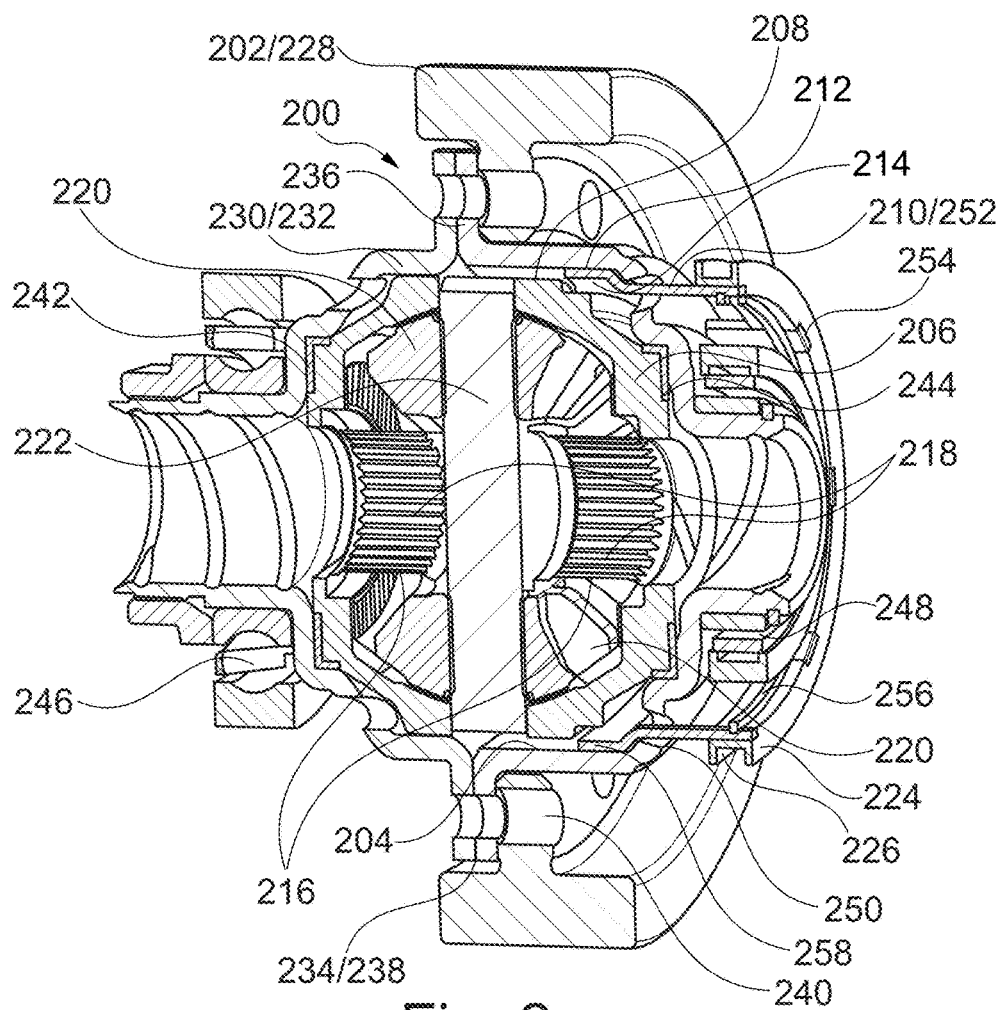
FIG. 2 illustrates a perspective cross-sectional view of a second embodiment of a differential according to an example aspect of the present disclosure.

The following description is made with reference to FIG. 2. FIG. 2 illustrates a perspective cross-sectional view of differential 200. Differential 200 for a vehicle (not shown) includes final drive gear 202 with final drive gear spline 204, differential carrier 206 with differential carrier spline 208, and axially slidable clutch 210. The axially slidable clutch includes first clutch spline 212 drivingly engaged with spline 204 and second clutch spline 214 for selectively drivingly engaging with spline 208 as described in more detail below. Differential 200 also includes side gears 216, each having an inner spline 218 for drivingly engaging a respective axle shaft (not shown), and radially offset spider gears 220, each drivingly engaged with both of the side gears, and shaft 222 extending through the radially offset spider gears into the differential carrier.

The axially slidable clutch includes ring portion 224 with circumferential notch 226 arranged for receiving a shift fork (not shown). The shift fork is engaged in the circumferential notch for axially displacing the axially slidable clutch to engage and disengage spline 214 with spline 208. The differential also includes a threaded shaft (not shown). The shift fork has a threaded portion (not shown), the threaded shaft is installed in the threaded portion, and rotation of the threaded shaft in the threaded portion pivots the shift fork. The shift fork of differential 200 is generally the same configuration as shift fork 128 of differential 100 described above.

Figure 3:
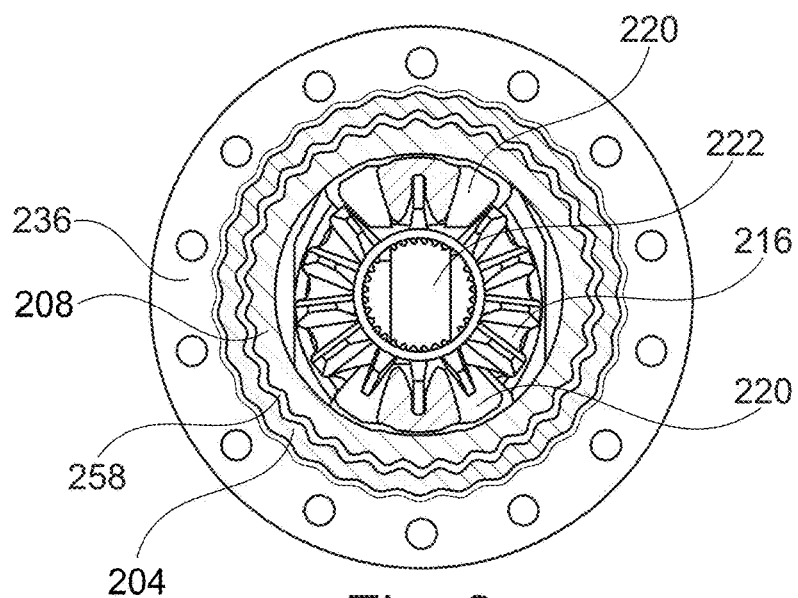
FIG. 3 is an end view of the embodiment show in FIG. 2 showing an axially slidable clutch disposed between a final drive gear spline and a differential carrier spline.

The following description is made with reference to FIGS. 2-3. FIG. 3 is an end view showing the axially slidable clutch disposed between the final drive gear spline and the differential carrier spline. As shown in FIG. 2, clutch spline 212 is drivingly engaged with the final drive gear spline and clutch spline 214 is selectively drivingly engaged with the differential carrier spline. As shown in FIG. 3, splines 204 and 208 have a generally undulating profile with a nearly constant thickness therebetween. It should be noted that an inner diameter of the final drive gear spline is greater than an outer diameter of the differential carrier spline. In other words, if the axially slidable clutch is removed, the final drive gear spline would rotate relative to the differential carrier spline, even if they were axially overlapping. Configuration of axially slidable clutch is similar to sleeve 52 shown and described in U.S. Pat. No. 10,883,548 titled ELECTRIC AXLE WITH DIFFERENTIAL SUN GEAR DISCONNECT CLUTCH to Lee, hereby incorporated by reference as if set forth fully herein.

Final drive gear 202 includes drive gear portion 228 and differential housing 230 fixed to the drive gear portion (e.g., by bolts, not shown). The differential housing includes the final drive gear spline. As shown in FIG. 2, differential housing 230 surrounds differential carrier 206. Differential housing 230 includes first differential housing half 232 with first radial wall 234 and second differential housing half 236 with second radial wall 238 in contact with first radial wall 234. The first radial wall and the second radial wall extend radially outwards and the drive gear portion has radially inwardly extending protrusion 240 radially aligned with the first radial wall and the second radial wall. By radially aligned, we mean that a line drawn normal to the radial direction passes through protrusion 240 and radial walls 234 and 238.

Differential 200 also includes bushings 242 and 244 on opposite axial sides of the differential carrier. The differential carrier is axially and rotatably supported in the differential housing by the bushings. Bearing 246, shown as a ball bearing and bearing 248, shown as a cylindrical roller bearing, support the differential housing in an axle housing (not shown).

Differential housing 230 includes apertures 250 and the axially slidable clutch includes axial projections 252 extending through respective apertures 250. Ring portion 224 includes recesses 254 for receiving the axial projections. Snap ring 256 is installed in respective grooves of the axial projections and the ring portion to axially position the axial projections in the ring portion. The projections connect spline portion 258 of the axially slidable clutch to ring portion 224.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Differential
102 Final drive gear
104 Final drive gear spline
106 Differential carrier
108 Differential carrier spline
110 Axially slidable clutch
112 First clutch spline
114 Second clutch spline
116 Side gears
118 Inner spline
120 Radially offset spider gears
122 Shaft
123 Hole
124 Ring portion
126 Circumferential notch
128 Shift fork
130 Pivot shaft
132 Threaded shaft
133 Bearing
134 Threaded portion
135 Electric motor
136 Drive gear portion
138 Spline portion
140 Cylindrical portion
142 Radially inwardly extending protrusion
144 Bearing
146 Bearing
148 Bearing
200 Differential
202 Final drive gear
204 Final drive gear spline
206 Differential carrier
208 Differential carrier spline
210 Axially slidable clutch
212 First clutch spline
214 Second clutch spline
216 Side gears
218 Inner spline
220 Radially offset spider gears
222 Shaft
224 Ring portion
226 Circumferential notch
228 Drive gear portion
230 Differential housing
232 First differential housing half
234 First radial wall
236 Second differential housing half
238 Second radial wall
240 Radially inwardly extending protrusion
242 Bushing
244 Bushing
246 Bearing
248 Bearing
250 Apertures
252 Axial protrusions
254 Recesses
256 Snap ring
258 Spline portion

What is claimed is:

1. A differential for a vehicle, comprising:
a final drive gear comprising a final drive gear spline;
a differential carrier comprising a differential carrier spline; and
an axially slidable clutch comprising:
a first clutch spline drivingly engaged with the final drive gear spline;
a second clutch spline for selectively drivingly engaging with the differential carrier spline, wherein the final drive gear spline and the differential carrier spline each have a generally undulating profile with an overlapping radial distance therebetween; and
a ring portion with a circumferential notch arranged for receiving a shift fork.

2. The differential of claim 1 further comprising:
a pair of side gears, each of the side gears comprising an inner spline for drivingly engaging a respective axle shaft;
a pair of radially offset spider gears, each of the radially offset spider gears being drivingly engaged with both of the side gears; and
a shaft extending through the pair of radially offset spider gears into the differential carrier.

3. The differential of claim 1 further comprising the shift fork engaged in the circumferential notch for axially displacing the axially slidable clutch to engage and disengage the second clutch spline with the other one of the final drive gear spline or the differential carrier spline.

4. The differential of claim 3 further comprising a threaded shaft, wherein:
the shift fork comprises a threaded portion;
the threaded shaft is installed in the threaded portion; and
rotation of the threaded shaft in the threaded portion pivots the shift fork.

5. The differential of claim 1 wherein the final drive gear comprises:
a drive gear portion; and
a differential housing fixed to the drive gear portion and comprising the final drive gear spline.

6. The differential of claim 5 wherein the differential housing surrounds the differential carrier.

7. The differential of claim 5 wherein the differential housing comprises:
a first differential housing half comprising a first radial wall; and
a second differential housing half comprising a second radial wall in contact with the first radial wall.

8. The differential of claim 7 wherein:
the first radial wall and the second radial wall extend radially outwards; and
the drive gear portion comprises a radially inwardly extending protrusion radially aligned with the first radial wall and the second radial wall.

9. The differential of claim 5 further comprising a bushing, wherein the differential housing is rotatably supported on the differential carrier by the bushing.

10. The differential of claim 5 wherein:
the differential housing comprises a plurality of apertures; and
the axially slidable clutch comprises a plurality of axial projections extending through respective ones of the plurality of apertures.

11. The differential of claim 1, wherein an inner diameter of the final drive gear spline is greater than an outer diameter of the differential carrier spline such, if the axially slidable clutch is not engaged with the differential carrier spline, the final drive gear spline is rotatable relative to the differential carrier spline.

12. The differential of claim 1, wherein the differential carrier spline axially overlaps the final drive gear spline.

\* \* \* \* \*